W. M. & J. B. Ellis,

Steam-Boiler Fire-Tube.

No. 544. Reissued Apr. 13, 1858.

AM. PHOTO-LITHO. CO. N.Y. (OSBORNE'S PROCESS.)

UNITED STATES PATENT OFFICE.

W. M. ELLIS AND J. B. ELLIS, OF WASHINGTON, DISTRICT OF COLUMBIA.

IMPROVEMENT IN STEAM-BOILERS.

Specification forming part of Letters Patent No. 18,276, dated September 29, 1857; Reissue No. 544, dated April 13, 1858.

*To all whom it may concern:*

Be it known that we, WILLIAM M. ELLIS and JONAS B. ELLIS, both of the city of Washington, in the District of Columbia, have invented a new and useful Improvement in Steam-Boilers, of which the following is a full, clear, and exact description, reference being had to the accompanying drawings, in which—

Figure 1:
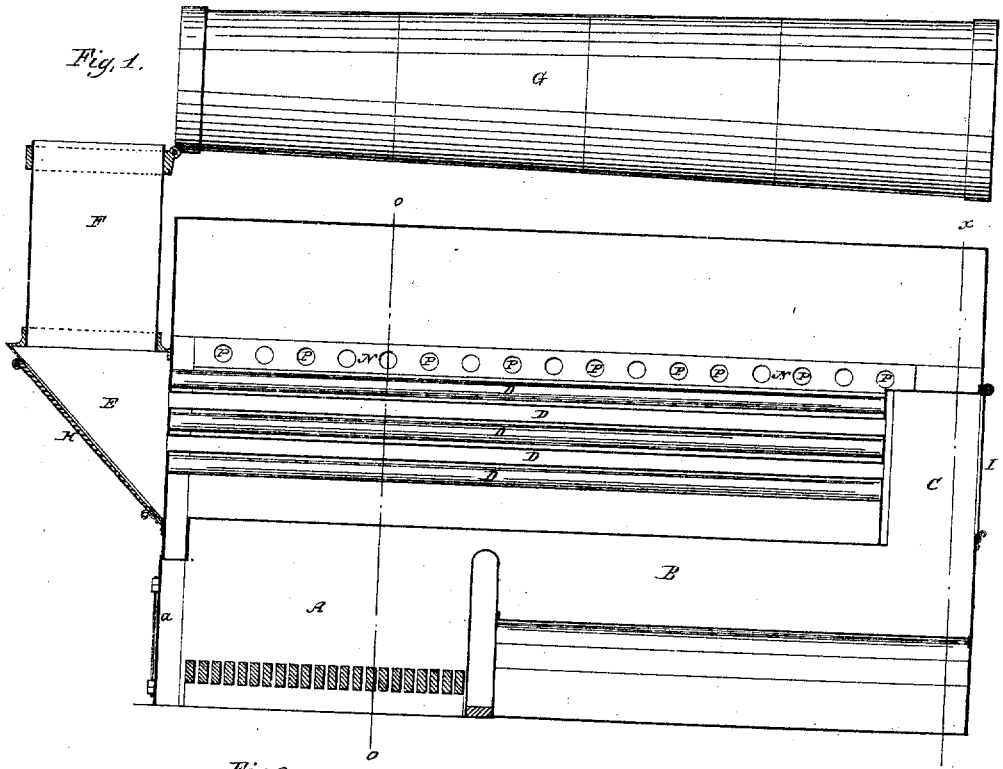
Figure 2:
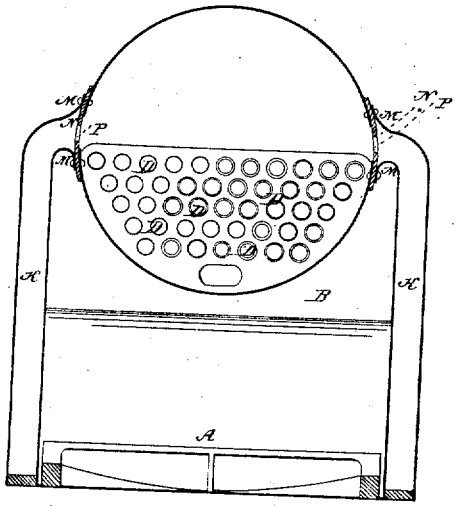
Figure 3:
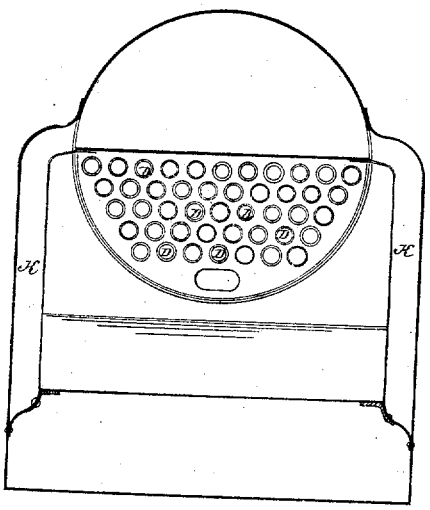

Figure 1 represents a vertical longitudinal section of a steam-boiler embracing our improvement. Fig. 2 represents a transverse section through the same at the line *o o*, and Fig. 3 represents a similar section at the line *x x* of Fig. 1.

The object of our invention is to enlarge the fire-surface and add to the strength of the boiler without correspondingly contracting its water-space or increasing its bulk or weight, and, further, by obviating the necessity for stays in the interior of the boiler to obtain more space for tubes, and thus provide incidentally for an increase of the flue surface also.

To carry out our invention we connect the water-legs to the body of the boiler by means of strong stay-plates of not less than twice the thickness of the shell of the boiler. In these plates are made a series of perforations of such size that, while they will not take away more than one-half of the transverse strength of the plate, they will yet afford sufficient space for the water to flow through freely between the water-legs and the body of the boiler. This mode of connecting the two semi-cylindrical portions of the boiler gives to it, without occupying its interior by stays, the strength it has hitherto derived from their introduction, thus securing to the boiler, in addition to its ordinary advantages, the strength of the cylindrical boiler without diminishing its capacity for receiving tubes for flues.

The accompanying drawings represent a portable steam-boiler embracing our improvement. Beneath the boiler is a furnace, A, with a door, *a*, on one side, through which the fuel may be supplied. A flue, B, serves to conduct the products of combustion from the furnace A to the chamber C at the rear of the boiler, where they enter the return-tubes D, which form a comunication between the space C and the smoke-box E. From the latter they escape by the chimney F to the open air. This chimney F is hinged or jointed, so that its upper portion G can be turned backward and downward when required to rest upon the top of the boiler.

In front of the smoke-box E, and in line with the return-tubes D, is a door, H, to facilitate the clearing of the tubes and smoke-box from cinders. A similar door, I, is placed at the opposite or rear end of the boiler.

The furnace A is surrounded by the water-legs K, which, in this instance, rise perpendicularly to the boiler, so as to unite with it just above the low-water line; or they may widen out gradually from the bottom to the level at which they are intended to unite with the boiler, and then be curved inward to it. These water-legs extend along each side of the shell of the boiler, being prolonged downward from the point of the greatest horizontal diameter from the front to the rear end of the boiler continuously. They are connected with the cylindrical part or body of the boiler, at the point of its greatest horizontal diameter, in the following manner: A stay-plate, N, of the same length as the shell of the boiler is placed between the flanges M of the water-legs K and the shell of the boiler and strongly riveted to both. Holes P are made through the stay-plate N to permit the water to circulate freely through the water-legs.

The drawings show the stay-plates interposed between the flanges of the legs and the outer side of the shell of the boiler; but it is evident that the flanges of the legs may be upon the inner side of the shell and the stay-plates then be between the two, and that whether the flanges be upon the inner or the outer side an additional stay-plate, when necessary, may be placed upon the outer or the inner side, as the case may be.

Having thus described our improvement, what we claim as our invention, and desire to secure by Letters Patent, is—

1. Connecting the water-legs extending from the front to the rear end of the boiler continuously to the shell of the boiler at the point of the greatest horizontal diameter of the boiler, substantially as herein set forth.

2. Interposing perforated plates between the flanges of the water-legs and the shell of the boiler, as and for the purposes described.

In testimony whereof we have hereunto subscribed our names this 9th day of March, 1858.

WM. M. ELLIS,
J. B. ELLIS.

Witnesses:
E. THOMPSON,
T. T. EVERETT.